Figure 1:
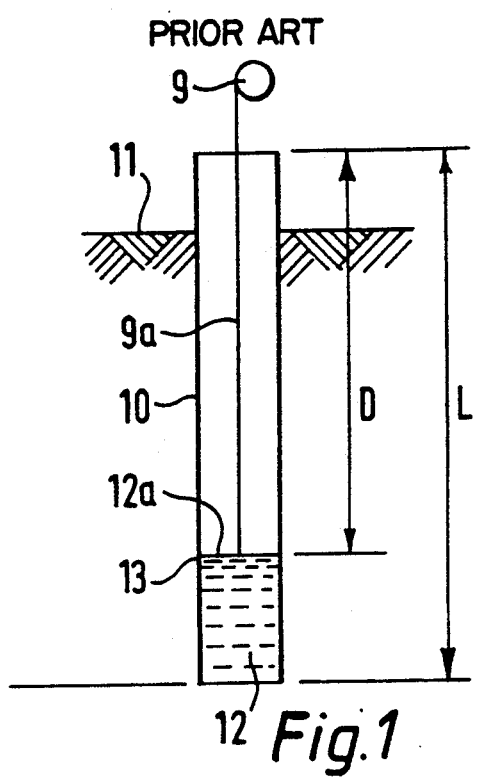

United States Patent [19]

Sweet

[11] Patent Number: 5,027,655

[45] Date of Patent: Jul. 2, 1991

[54] METHOD AND APPARATUS FOR MEASURING LIQUID LEVEL IN THE GROUND

[75] Inventor: Christopher R. Sweet, Stoney Stanton, United Kingdom

[73] Assignee: Geotechnical Instruments (UK) Limited, United Kingdom

[21] Appl. No.: 416,304

[22] Filed: Oct. 3, 1989

[30] Foreign Application Priority Data

Oct. 5, 1988 [GB] United Kingdom ............... 8823391

[51] Int. Cl.$^5$ ............................................. G01F 23/28
[52] U.S. Cl. .................................. 73/290 V; 324/643; 364/509
[58] Field of Search ............... 73/290 V, 290 R, 579; 324/643, 633, 644; 73/579; 181/106; 364/509; 367/908

[56] References Cited

U.S. PATENT DOCUMENTS

| | | | |
|---|---|---|---|
| 3,834,233 | 9/1974 | Willis et al. | 73/290 V |
| 4,044,355 | 8/1977 | Edvardsson | 73/290 V |
| 4,101,865 | 7/1978 | Schurr | 73/290 V |
| 4,227,182 | 10/1980 | Ogasawara et al. | 73/579 X |
| 4,250,974 | 2/1981 | Heilhecker et al. | 73/155 X |
| 4,458,530 | 7/1984 | Bastida | 73/290 R |
| 4,473,822 | 9/1984 | Schiffl | 73/579 |
| 4,566,321 | 1/1986 | Zacchio | 324/643 X |
| 4,573,356 | 3/1986 | Barmatz et al. | 181/5 X |
| 4,623,835 | 11/1986 | Mehdizadeh et al. | 324/644 X |
| 4,805,453 | 2/1989 | Haynes | 73/292 |
| 4,811,595 | 3/1989 | Marciniak et al. | 73/290 V |
| 4,815,323 | 3/1989 | Ellinger et al. | 73/292 |
| 4,869,338 | 9/1989 | Wiggins et al. | 181/106 |

Primary Examiner—Daniel M. Yasich
Attorney, Agent, or Firm—Roylance, Abrams, Berdo & Goodman

[57] ABSTRACT

A method of detecting water level in an elongate cavity comprises emitting an alternating signal into the cavity, varying the frequency of said signal to provide a specific response from the cavity, detecting said response, and comparing said outgoing signal and response. In a preferred embodiment the response is a returning signal reflected from the surface of the water. The frequency of the outgoing signal may be varied continuously to establish a substantially steady state difference frequency between the outgoing and returning signal.

15 Claims, 3 Drawing Sheets

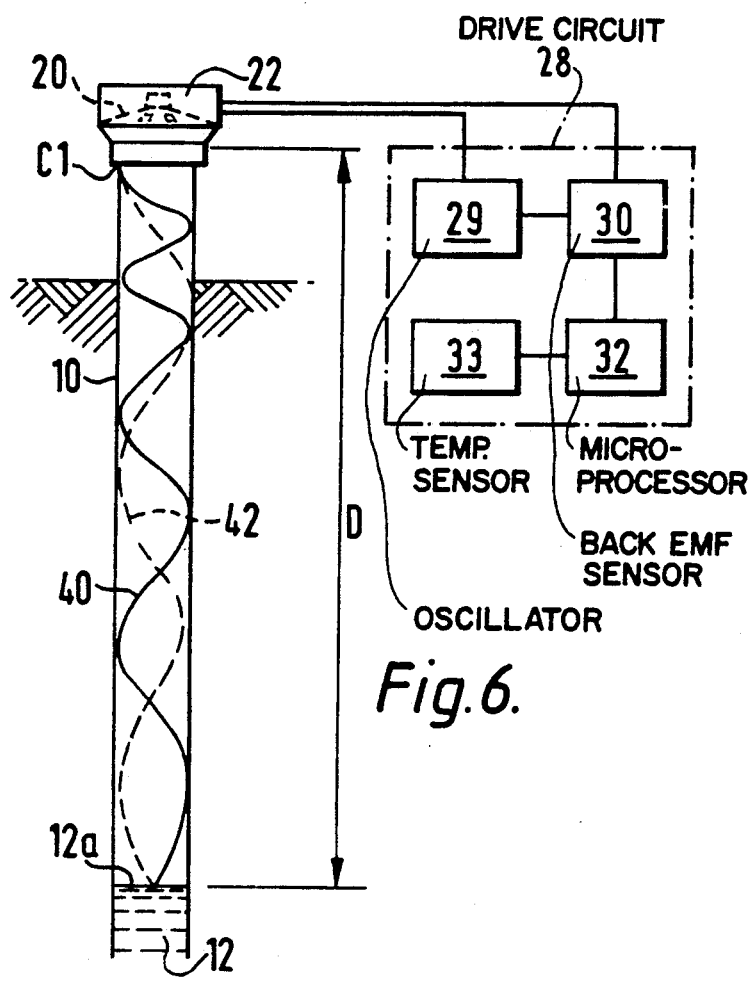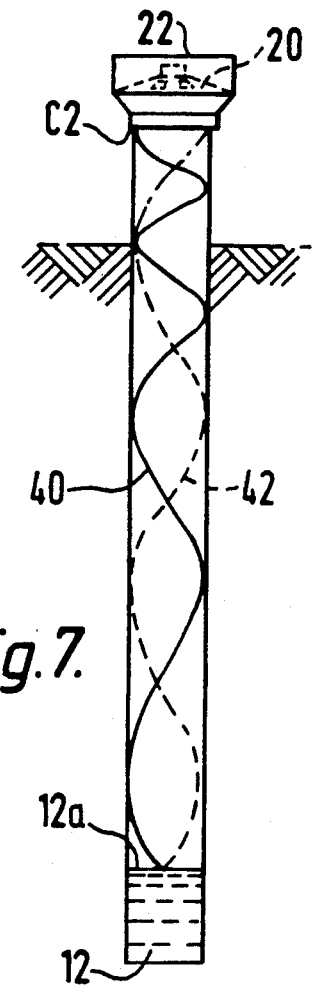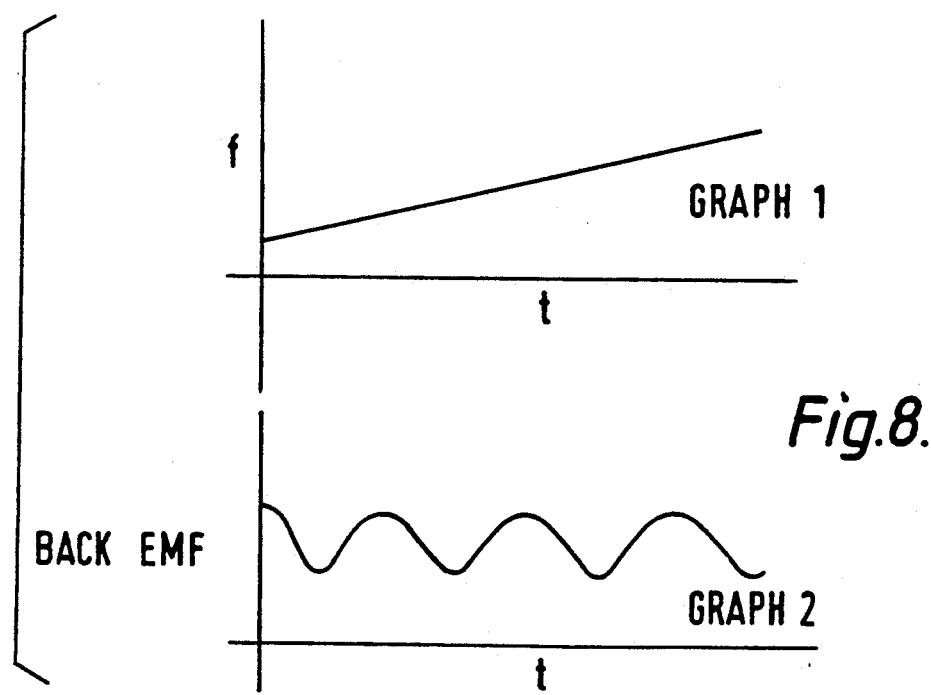

METHOD AND APPARATUS FOR MEASURING LIQUID LEVEL IN THE GROUND

The invention relates to the measurement of liquid level and is particularly, but not exclusively concerned with the measurement of liquid level in a borehole.

It is common to use an elongate cavity in the form of a borehole, typically lined with a standpipe, to enable water levels to be monitored in civil engineering earthworks or in site investigations.

Knowledge of the water level may be used to indicate the actual level of the water table in undisturbed ground or may for example indicate the ground pressure in cases where an earth dam or large building has been constructed. Civil engineering earthworks are dependent for their integrity on accurate knowledge of the actual water level since a saturated earthwork may collapse without warning. Similarly the integrity of foundations of large buildings and other man-made structures will be affected by the water level. Collapses may occur during periods of heavy rainfall as the soil becomes fluid and can have disastrous consequences which may lead to considerable loss of life.

It is thus important to be able to determine the actual fluid level and monitor changes in the fluid level over a period of time.

The use of boreholes has been known for decades and the level of water in the pipe has been determined in several ways. One basic method has involved the introduction of a long measuring tape into the borehole or standpipe which is lowered until an electrode on the tape engages the surface of the water and a direct measurement of water level is obtained by reading graduations on the tape. Another method has involved introducing a tube having an open end which is positioned below the surface of the water in the borehole or standpipe. Gas is then pumped through the tube and when the pressure of the gas corresponds to the pressure of the water at the foot of the tube, the gas will escape from the lower end of the tube. Once that pressure is known, the water level can be determined bearing in mind that the distance between the top of the borehole or standpipe and the lower end of the tube will be known. Both of the foregoing systems suffer from the disadvantage that is time consuming to lower the tape or tube in order to take a reading. Also, if the standpipe is inclined or bent to any extent it can be difficult to lower the measuring tape or tube into the pipe.

It has also been proposed previously to use a sound pulse directed from ground level towards the surface of the water, instrumentation being provided to measure the time taken for the sound to be reflected from the water surface back to the sound source and to calculate the position of the water surface. Such a system can be rendered inaccurate if the pulse is reflected by some small obstruction in the borehole or if the pipe is bent causing the pulse to be reflected from a wall section of the pipe rather than the surface of the water.

An object of the present invention is to provide an improved system suitable for measuring the level of water in a borehole or other environment and which substantially reduces the disadvantages of earlier methods.

According to one aspect of the invention there is provided a method of measuring liquid level in a elongate cavity comprising the steps of emitting an alternating signal adjacent the upper end of the cavity, varying the frequency of the signal to provide a specific response in the cavity, detecting the response and comparing the signal parameters to enable the level of the liquid in the cavity to be determined.

Such a method has the advantage that a steady state electrical response is obtained and such a response has much less chance of giving a spurious reading. The steady state response may be obtained at several different frequencies to check the accuracy of the measured water level.

Preferably the borehole wall is reasonably non-absorbent so that the returning signal is sufficiently strong to be detected. Furthermore the borehole should preferably not have a substantial unknown discontinuity, since such a discontinuity might act as a strong reflector of the emitted signal and thus give a spurious result.

The response may be a returning signal reflected from the surface of the liquid, and the returning signal may be in phase or out of phase with the signal emitted by the device. The returning signal may be in phase or out of phase with a signal emitted by the device substantially at the time that the returning signal reaches the device emitting the signal. In a preferred embodiment the device is capable of emitting and detecting a substantially continuous signal whose frequency may vary with time.

Preferably the device for emitting the signal emits a frequency which varies with time and the difference between the emitted and received signal gives an indication of the actual liquid level.

The frequency may be varied such that the frequency of the device when emitting a first signal will be different from the frequency being emitted when the reflection of the first signal arrives back at the device. In such a case, the frequency of the returning signal will either tend to reinforce or oppose the emitted signal and the means for sensing the response may be arranged to sense the amount of coherence between the emitted and reflected signals. From the sensed response, the liquid level can be determined.

The frequency may instead be varied until a resonance point is found in the cavity above the water level. From the resonant frequency the liquid level can be determined.

In another case, the frequency may be varied until an anti-resonance is found and, again, from the anti-resonant frequency the water level can be determined.

As the temperature of the air in the cavity above the liquid level will have an effect on the speed of sound, means may be provided to compensate for the temperature of the air.

Preferably, the method involves using a sound signal which may be provided by an electromagnetic source such as a loudspeaker.

The cavity may comprise a borehole which may be lined with or contain a standpipe. In the latter case, the method preferably involves using the device to emit the sound into the standpipe.

According to another aspect of the invention there is provided apparatus for performing the method according to the preceding paragraphs where the signal is provided by an electromagnetic or other electrically controllable device such as a loudspeaker. The device may be mounted in a housing which locates in and/or around the upper end of the cavity. Preferably, the housing closes the upper end of the cavity.

The apparatus preferably includes means for sensing a back EMF of the electromagnetic device.

Where the frequency of the emitted signal is to be varied to produce reflected signals which have varying coherence with the emitted signals, the means may sense a back EMF which increases or decreases with respective increases or decreases in coherence. Having established the frequencies for particular levels of coherence, the level of the liquid can be determined.

Where the frequency is varied until a resonance is found, the back EMF will be at its greatest.

Where the frequency is varied until an anti-resonance is found, the back EMF will be at its smallest.

From the back EMF signals obtained, the water level can be determined quickly and accurately, preferably by using a microprocessor.

Figure 2:
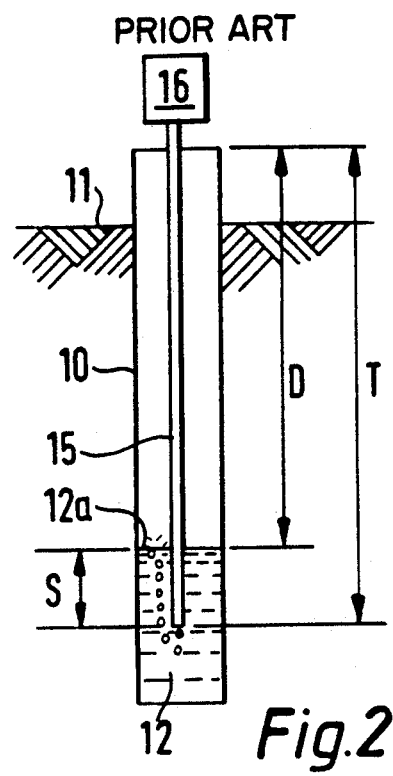
Figure 3:
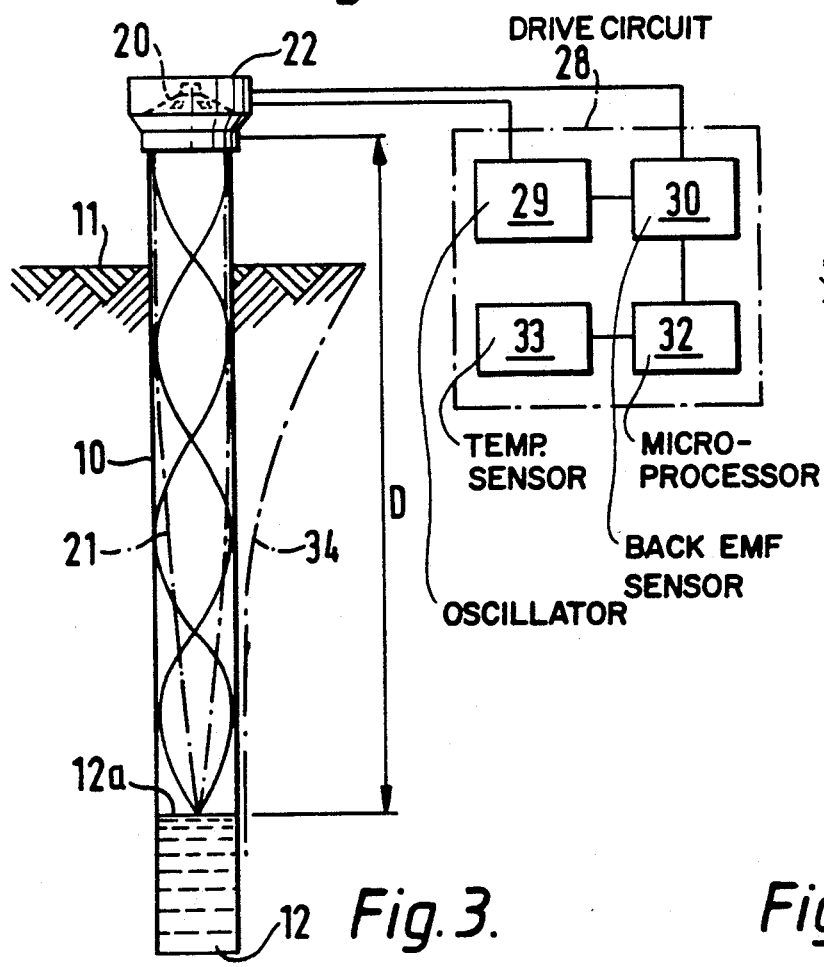
Figure 4:
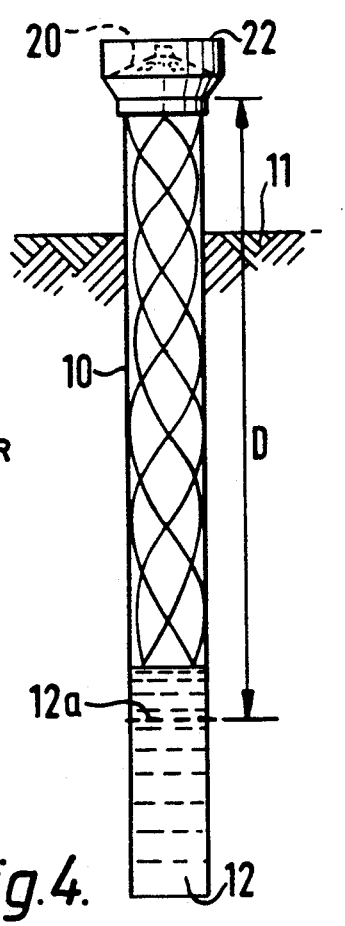
Figure 9:
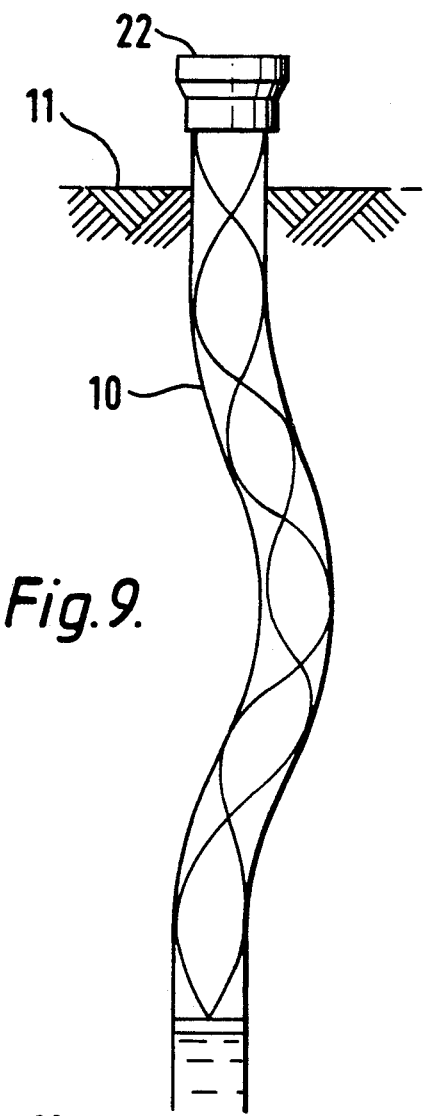
Figure 5:
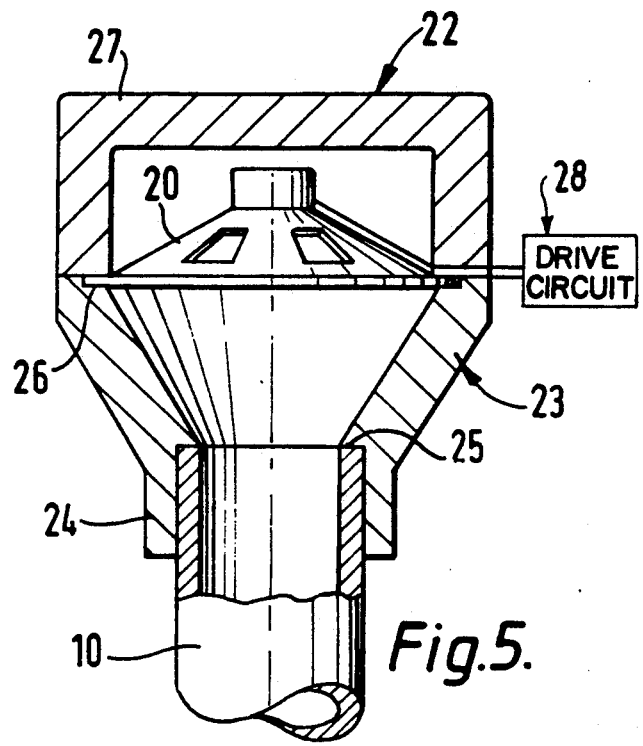

The invention will now be described by way of example with reference to the accompanying drawings in which:

FIGS. 1 and 2 show prior methods of measuring the water level in a standpipe,

FIG. 3 illustrates apparatus for determining water level in a standpipe shown graphically in accordance with the present invention with the column of air above the water at a resonant frequency and the drive circuit shown schematically, FIG. 4 shows the graphic representation of the standpipe of FIG. 3 with the column of air at anti-resonant frequency, FIG. 5 shows a cross-section through a loudspeaker housing for location on the upper end of the standpipe and drawn to a larger scale, FIGS. 6 and 7 graphically illustrate waves in a standpipe where the degree of coherence between emitted and reflected waves is sensed for determination of water level with the drive circuit shown schematically in FIG. 6, FIG. 8 shows frequency and back EMF graphs, and FIG. 9 shows the way in which the present invention can be used where a standpipe is deformed.

Figure 10:
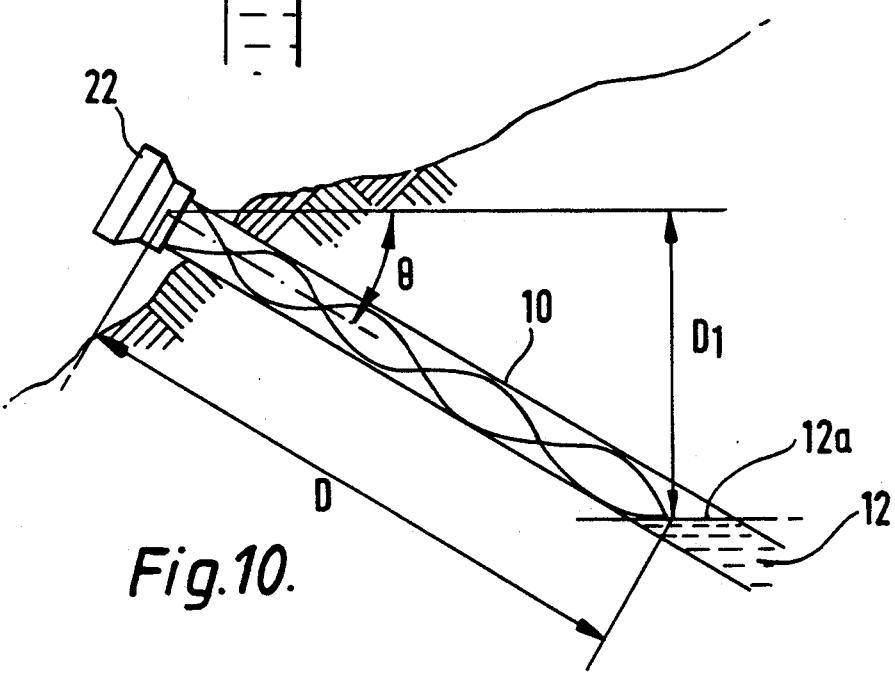

FIG. 10 shows an inclined standpipe.

In FIG. 1, a standpipe 10 is located in the ground 11 in known manner. It is not uncommon for the lower end of a standpipe to be 100 meters of so below the surface of the ground 11. Water 12 collects in the standpipe and rises to a level indicated at 13 dependent on ground pressure. The ground pressure may be affected by the presence of earthworks or other ground loadings such as large buildings. The length L of the standpipe 10 is known and once the level 13 of the water 12 is determined, the pressure in the ground at the lower end of the standpipe can be calculated. In FIG. 1, the water level 13 is detected by means of a tape measure 9a of a "dip meter" 9 which is lowered until an electrode at its lower end engages the surface of the water 12. The distance D between the upper end of the standpipe and the water surface 12a is then immediately apparent from graduations on the dip meter tape 9a. The dip meter method is somewhat tedious as it can take a considerable amount of time to lower the tape into a very long standpipe. Also, if there is any minor blockage such as a small stone in the standpipe, it can sometimes be difficult to maneuver the lower end of the tape around the blockage.

In FIG. 2, a tube 15 is lowered into the standpipe 10 until its bottom end is below the surface 12a of the water 12. The distance T between the upper end of the standpipe 10 and the lower end of the tube 15 is known and air is pumped through the tube 15 by a pump and air flow controller 16 until sufficient pressure builds up in the tube to cause the air to escape slowly from the lower end. The maximum pressure reached in the tube 15 is detected and the distance S between the lower end of the tube 15 and the water surface 12a can then be determined and the depth D can be calculated. Again, this particular system can be slow to use in view of the time taken to lower the tube 15 into the standpipe.

Both of the methods described with respect to FIGS. 1 and 2 are difficult to use if the standpipe is substantially inclined or bent as shown in FIG. 9 as the tape 9a and tube 15 do not readily maneuver around the bends and do not easily move along inclined sections of the standpipe.

One form of apparatus in accordance with the present invention is shown in FIGS. 3 to 5. In FIG. 3, a loudspeaker 20 within a housing 22 is positioned at the upper end of the standpipe 10. As shown clearly in FIG. 5 the housing 22 comprises a generally frustoconical body 23 having a cylindrical extension 24 at its lower end. The extension 24 receives the upper end of the standpipe 10 which engages an annular shoulder 25 on the body 23. The upper end of the body 23 is formed with a further annular shoulder 26 FIG. 5 which supports the loudspeaker 20, the loudspeaker being held in position by means of a cover 27 suitably secured to the body 23.

The loudspeaker 20 is powered by a conventional drive circuit 28 which includes an oscillator 29, a back EMF measurement circuit 30 and a microprocessor 32.

In use, the housing 22 is positioned as shown in FIG. 3 and the drive circuit 28 is operated to cause the loudspeaker 20 to emit sound over a frequency range to provide at least two resonant frequencies in the column of air between the surface 12a and the upper end of the standpipe 10. Unless the water level 13 is very high in a long standpipe, it will not normally be possible with a loudspeaker to produce a resonance at the fundamental frequency (fo) of the standpipe which would provide a quarter wavelength as shown in broken lines 21 in FIG. 3. Therefore a note of higher frequency than the fundamental frequency is used to produce a resonance. At resonance, the back EMF from the loudspeaker will be at its maximum and the circuit 30 will quickly register the resonant frequencies throughout the swept range. Those resonant frequencies are used by the microprocessor 32 to determine the distance D between the surface 12a of the water and the upper end of the pipe.

Closed pipes provide odd harmonics. Therefore, if fo is the fundamental frequency, 3 fo, 5 fo, 7 fo . . . 27 fo, 29 fo, 31 fo etc., will provide overtone resonant frequencies. The difference between two adjacent odd harmonics e.g., 27 fo, 29 fo is equal to 2 fo and so the fundamental frequency can easily be determined. Once the fundamental frequency is known, the depth D can be determined starting from the equation:

$$V = f\lambda$$

Where V is the velocity of sound in air and $\lambda$ is wavelength. In a closed tube $\lambda = 4$ D at fo. Therefore $$D = \frac{V}{4fo}$$

The value of V is known and the microprocessor 32 is programmed to provide the distance D from the given parameters V and the resonant frequencies.

It is well known that the velocity of sound in air varies with temperature and circuitry 33 can be provided for introducing a temperature correction factor into the microprocessor 32. Given the temperature at the surface of the ground, and since the temperature in the ground is substantially constant, a temperature gradient 34 can be provided by tables and the information fed into circuitry 33 for use by the microprocessor 32. As the velocity of sound in air is proportional to the square root of absolute temperature then the distance D is given by the equation $$D = \frac{Vo}{fo} \sqrt{\frac{t}{273}}$$

Where Vo is the velocity of sound at 0 degrees centigrade and t is the average temperature of the air in the standpipe 10.

Instead of using resonance in the standpipe 10 to determine the water level, an anti-resonance may be used as illustrated in FIG. 4 where maximum work is required by the loudspeaker 20 to produce a sound wave in the pipe. Again, the back EMF is measured at various frequencies and the results used to calculate the distance D.

If desired, in any given frequency range both the resonant and anti-resonant frequencies can be used and the results computed to provide a very accurate figure for the distance D.

This method of operation may be automated by arranging for a relatively slow and continuous change in frequency emitted by the loudspeaker 20. Provided the rate of change is small in relation to the signal transit time, this method can be equated to manual tuning of the frequencies to detect resonant and anti-resonant frequencies.

The apparatus of FIGS. 3 to 5 can be used differently as described now with reference to FIGS. 6 and 7.

Instead of varying frequency to find a specific point of resonance or anti-resonance, which can take some time, the method may be speeded up by sensing the degree of coherence between the emitted signal and the signal reflected from the surface of the water while slowly increasing or decreasing, i.e. adjusting the emitted frequency. This method is equivalent to automated manual tuning and relies on the rate of frequency change being small in relation to the signal transit time.

In FIG. 6, the frequency of the emitted signal 40 shown in full lines increases with time (hence the decreasing wavelength shown near the upper end of the standpipe 10). Due to the time taken for the signal to travel distance D and back, the reflected signal 42 arrives at the loudspeaker 20 after the frequency of the emitted signal 40 has increased. Maximum or first coherence between the emitted and relfected signals is shown in FIG. 6 at C1 and the back EMF produced by the loudspeaker will be at its greatest. A condition of minimum or second coherence between the emitted and reflected signals is shown at C2 where the back EMF produced by the loudspeaker will be at its minimum. Knowing the frequencies at which the maximum and minimum coherence between the emitted and reflected signals occurs enables the distance D to be calculated. This particular method enables the distance D to be determined in the microprocessor 32 more quickly than with the methods described with respect to FIGS. 3 to 5 as time does not have to be spent in finding specific points of resonance or anti-resonance.

In this method, provided the rate of change of frequency is large in relation to the time for the frequency to be emitted and received, the relative change in frequency will be detectable. A constant difference frequency will be established if the rate of frequency change is constant, and thus enables the liquid level to be determined.

FIG. 8 shows in Graph 1 the way in which a frequency f increasing over a given time (t) results in an increase and decrease in back EMF as the coherence between the transmitted and reflected signals increases and decreases.

The depth of fluid may be calculated in the following way where:
t = time
f = frequency
c = speed of sound
d = depth of liquid
h = rate of change of frequency
$t_1$ = time of emitted signal
$t_2$ = time of emission of received signal
$f_1$ = frequency of emitted signal
$f_2$ = frequency of received signal A fixed frequency signal can be described as $$\text{output} = \text{sine } (2\pi t f)$$

for a changing frequency:

$$\text{output}_1 = \text{sine } (2\pi (t \times (h \times t_1)))$$

and $$\text{output}_2 = \text{sine } (2\pi (t \times (h \times t_2)))$$

If $$\text{output}_1 = \text{sine } (A) \text{ and output}_2 = \text{sine } (B)$$

Then by combining the signals in an electronic multiplier a constant difference signal can be obtained:

$$\text{sine } (A) \text{ sine } (B) = 0.5(\cos (A-B) - \cos (A+B))$$

By electronically filtering out the high frequency component, the low frequency component can be obtained (the magnitude of the difference frequency is unimportant).

$$\text{sine } (A) \text{ sine } (B) = 0.5 \cos (A-B)$$

or $$\text{output}_1 \times \text{output}_2 = 0.5 \cos (A+B)$$

This represents the difference between the frequency emitted (time $t_1$) and the frequency received (time $t_2$)

$$d = c \frac{(t_1 - t_2)}{2}$$

or by substitution $$d = c \frac{(f_1 - f_2)}{2h}$$

and thus the liquid level can be calculated.

If there are any small obstructions in the standpipe, it is envisaged that they will have little effect on the accuracy of the measurement as the sound will travel around them without difficulty.

Also where the standpipe 10 is deformed e.g., due to ground movement, as shown in FIG. 9 the distance between the upper end of the standpipe 10 and the surface 12a of the water can be accurately measured as the sound waves will travel around the deformation.

In FIG. 10, the standpipe enters the ground at a known angle $\theta$. The present invention can be used to determine the distance D and once D is known, the depth D1 of the water level beneath the ground can be calculated using the equation:

$$D1 = D \sin \theta$$

The microprocessor 32 can be programmed to provide a reading for D1 given D and $\theta$.

The present invention enables the depth D in standpipes to be measured quickly and accurately and is highly advantageous over previously proposed systems.

Where no standpipe 10 is provided, the loudspeaker can be located at the upper end of a simple borehole to enable water level therein to be determined.

Whilst specific reference has been made to elongate cavities in the form of boreholes or standpipes in the ground, it will be appreciated that the invention may be used in other applications or any environment where a determination of a liquid level or change in liquid level is required provided that the borehole has a reasonably non-absorbent lining and does not have a dramatic discontinuity.

I claim:

1. A method of measuring the level of a liquid in a elongate cavity, comprising the steps of:
    emitting an outgoing alternating sound signal adjacent an upper end of the cavity;
    detecting a returning signal of the sound signal reflected from the surface of the liquid;
    adjusting the frequency of the outgoing signal to provide a first coherence with the returning signal;
    adjusting the frequency of the outgoing signal to provide a second coherence with the returning signal; and
    comparing parameters of the outgoing signal and the returning signal at the first coherence and the second coherence to determine the liquid level.

2. A method according to claim 1 wherein for each coherence the frequency of the outgoing signal is adjusted until the returning signal is out of phase with the outgoing signal when the returning signal is adjacent the upper end of the cavity.

3. A method according to claim 1 wherein for each coherence the frequency of the outgoing signal is adjusted until the returning signal is in phase with the outgoing signal when the returning signal is adjacent the upper end of the cavity.

4. A method according to claim 1 wherein the frequency of the outgoing signal varies continually over a period of time, the rate of change of frequency being sufficiently large in relation to the signal transit time to ensure that the frequency of the returning signal has a detectable difference from the frequency of the outgoing signal; and
    the method further including the steps of: recording the rate of change of the frequency of the outgoing signal; comparing the frequency of the outgoing signal and the frequency of the returning signal as the outgoing frequency changes to detect a steady state difference frequency; and using the difference frequency and rate of change of frequency to determine the liquid level.

5. A method according to claim 4 wherein the rate of change of the frequency of the outgoing signal is substantially constant.

6. A method according to claim 1 wherein the degree of the first and second coherence is the same.

7. A method according to claim 1 wherein the frequency of the outgoing signal changes continually and the returning signal is measured to establish coherence, the rate of change of frequency being small in relation to the signal transit time.

8. Apparatus for measuring the level of a liquid in an elongate cavity having an upper end and comprising:
    means for emitting an outgoing alternating sound signal adjacent the upper end of the cavity;
    means for detecting a returning signal of the sound signal reflected from the surface of the liquid;
    means for adjusting the frequency of the outgoing signal to provide a first coherence with the returning signal and to provide a second coherence with the returning signal; and
    means for comparing parameters of the outgoing signal and returning signal at the first coherence and the second coherence to determine the liquid level.

9. Apparatus according to claim 8 wherein said means for detecting the returning signal is adapted to detect when the returning signal is in phase with the outgoing signal.

10. Apparatus according to claim 9 wherein said means for detecting the returning signal is adapted to detect when the returning signal is out of phase with the outgoing signal.

11. Apparatus according to claim 9 wherein said means for adjusting the frequency of the outgoing signal includes means for automatically and continuously varying the frequency.

12. Apparatus according to claim 11 wherein said means for adjusting the frequency is adapted to vary the frequency of the outgoing signal at a substantially constant rate.

13. Apparatus according to claim 8 wherein said means for emitting a signal is a loudspeaker.

14. Apparatus according to claim 8 wherein said means for emitting comprise an electromagnetic device; and said means for detecting comprise means for measuring the degree of coherence between the outgoing and returning signals by sensing the back EMF of said electromagnetic device.

15. Apparatus according to claim 8 wherein the means for emitting the signal is contained in a housing adapted for close fitting connection to said upper end of said cavity.

* * * * *